US010311917B2

(12) United States Patent
Smith et al.

(10) Patent No.: US 10,311,917 B2
(45) Date of Patent: Jun. 4, 2019

(54) SYSTEMS AND METHODS FOR FEATURING A PERSON IN A VIDEO USING PERFORMANCE DATA ASSOCIATED WITH THE PERSON

(71) Applicant: Disney Enterprises, Inc., Burbank, CA (US)

(72) Inventors: Tony R. Smith, Sherman Oaks, CA (US); Edward C. Drake, Stevenson Ranch, CA (US); Benjamin Havey, Burbank, CA (US); Alexander C. Chen, La Canada-Flintridge, CA (US)

(73) Assignee: Disney Enterprises, Inc., Burbank, CA (US)

(*) Notice: Subject to any disclaimer, the term of this patent is extended or adjusted under 35 U.S.C. 154(b) by 257 days.

(21) Appl. No.: 15/216,584

(22) Filed: Jul. 21, 2016

(65) Prior Publication Data

US 2018/0025750 A1   Jan. 25, 2018

(51) Int. Cl.
| G06F 3/00 | (2006.01) |
| G11B 27/036 | (2006.01) |
| G06F 3/0482 | (2013.01) |
| G06F 3/0484 | (2013.01) |
| G06K 9/00 | (2006.01) |
| G06T 19/00 | (2011.01) |
| H04N 21/44 | (2011.01) |
| H04N 21/4402 | (2011.01) |
| G06Q 10/10 | (2012.01) |
| H04N 21/472 | (2011.01) |
| H04N 21/854 | (2011.01) |

(52) U.S. Cl.
CPC .......... *G11B 27/036* (2013.01); *G06F 3/0482* (2013.01); *G06F 3/04847* (2013.01); *G06K 9/00302* (2013.01); *G06K 9/00342* (2013.01); *G06Q 10/1053* (2013.01); *G06T 19/006* (2013.01); *H04N 21/44* (2013.01); *H04N 21/44008* (2013.01); *H04N 21/44016* (2013.01); *H04N 21/44029* (2013.01); *H04N 21/47205* (2013.01); *H04N 21/854* (2013.01)

(58) Field of Classification Search
CPC ........................... G06F 3/0482; G11B 27/036
USPC ........................................ 715/716, 722, 723
See application file for complete search history.

(56) References Cited

U.S. PATENT DOCUMENTS

2007/0132780 A1* 6/2007 Garbow ................. G06Q 30/02
                                                                              345/619
2010/0218098 A1* 8/2010 Sitrick ................. G09B 15/002
                                                                              715/719

FOREIGN PATENT DOCUMENTS

CN            101563698 A       10/2009

* cited by examiner

*Primary Examiner* — Andrey Belousov
(74) *Attorney, Agent, or Firm* — Farjami & Farjami LLP

(57) ABSTRACT

There is provided a system comprising a non-transitory memory and a hardware processor configured to determine elements of a performance in a video, identify one or more people to feature in the video based on the elements of the performance in the video, receive a user input selecting a person from the one or more people to feature in the video, retrieve performance data for featuring the selected person in the video based on actions performed by the actor in the video, create a personalized video by featuring the selected person in the video using the performance data, and display the personalized video on a user device.

16 Claims, 10 Drawing Sheets

| Character to Replace | Replacement Actor | | |
|---|---|---|---|
| | | Quality | Popularity |
| Character A | Actor 1 | ●●●○○ | ●●●○○ |
| | Actor 2 | ●●●●○ | ●●●●○ |
| | Actor 3 | ●●○○○ | ●●●○○ |
| Character B | Actor 4 | ●●●○○ | ●●●●○ |
| | Actor 5 | ●●●○○ | ●●●○○ |
| Character C | Actor 6 | ●●●○○ | ●●○○○ |
| Character D | Actor 1 | ●●●○○ | ●●●○○ |
| | Actor 5 | ●●●○○ | ●●●○○ |
| | Actor 6 | ●●●●○ | ●○○○○ |

FIG. 5

SYSTEMS AND METHODS FOR FEATURING A PERSON IN A VIDEO USING PERFORMANCE DATA ASSOCIATED WITH THE PERSON

BACKGROUND

Conventionally, creation of a movie includes choosing a cast of actors and actresses (hereinafter collectively referred to as "actors") to portray various characters in the movie. Choosing actors to portray different characters may take a great deal of time, and the choice of each actor includes considering the requirements for the particular role. A director and/or movie studio may select the cast of actors selected to portray the characters in the movie.

SUMMARY

The present disclosure is directed to systems and methods for featuring a person in a video using performance data associated with the person, substantially as shown in and/or described in connection with at least one of the figures, as set forth more completely in the claims. According to one aspect, content creators and/or viewers may wish to create and/or view a movie with actors of their choice.

BRIEF DESCRIPTION OF THE DRAWINGS

FIG. 5 shows a diagram of an exemplary user interface for featuring a person in a video using performance data associated with the person, according to one implementation of the present disclosure;

DETAILED DESCRIPTION

Figure 1:
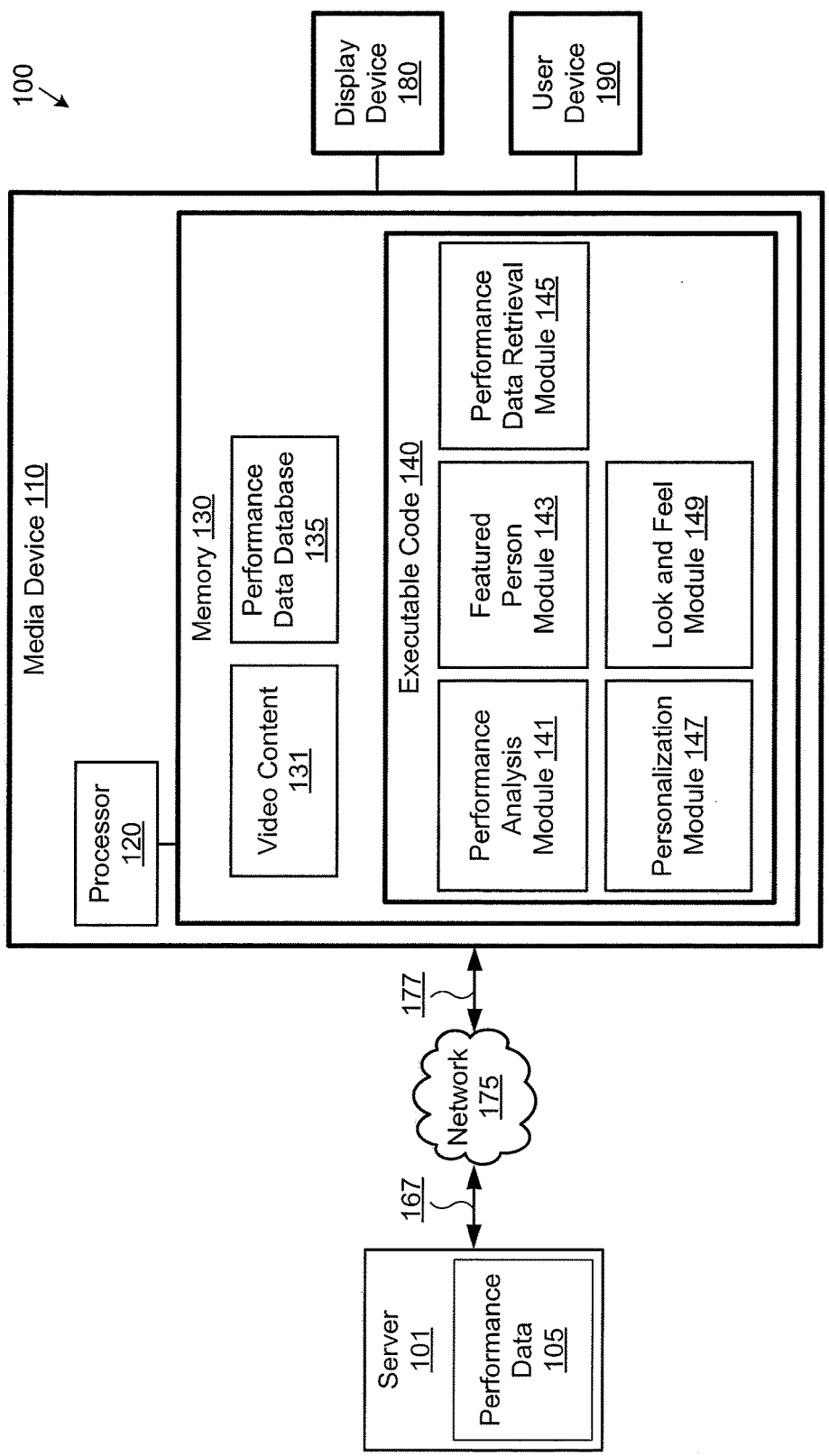
FIG. 1 shows a diagram of an exemplary system for featuring a person in a video using performance data associated with the person, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for featuring (e.g., inserting or replacing) a person in a video using performance data associated with the person, according to one implementation of the present disclosure. System 100 shows server 101, media device 110, network 175, display device 180, and user device 190. Server 101 may be a media server storing videos, images, etc. In some implementations, server 101 may be connected to network 175 via connection 167, and network 175 may be connected to media device 110 via connection 177. Network 175 may be a computer network, such as the Internet. As shown in FIG. 1, server 101 includes performance data 105. Performance data 105 may include data related to various elements of video such as video content 131. In some implementations, performance data 105 may include information about one or more people, each of whom a user may select to feature in a video, such as video content 131. For example, performance data 105 may include video clips of each person performing various actions, such as crying, laughing, jumping, dancing, etc. Performance data 105 may include video clips showing facial expressions and/or emotions made by each person. In some implementations, performance data 105 may include video clips from other movies, or on a video sharing website, such as YOUTUBE™ (youtube.com), an informational website, such as the Internet Movie Database (imdb.com), various photographs available on the Internet, etc.

In one implementation, performance data 105 may include facial expressions, scenes in which the person has appeared, including actions such as dancing, running, etc. Performance data 105 may include video or photographic content from which a model of the person may be constructed, such as a plurality of images of the person's face from various angles, a plurality of full body images of the person, etc. Performance data 105 may include facial expression data, height data, weight data, etc., associated with each person who may be selected to be featured.

The performance data 105 may be collected from a relatively new actor (who is trying to get into the television or movie industry), an experienced actor (who has been in previous TV shows or movies), or someone with no professional acting experience, such as a user of the user device 190.

Media device 110 may be a device for playing video content 131, such as a computer, a television, an entertainment system, etc. Media device 110 includes processor 120 and memory 130. Processor 120 is a hardware processor, such as a central processing unit (CPU), found in media device 110. Memory 130 is a non-transitory memory device for storing computer code for execution by processor 120, and also for storing various data and parameters. Memory 130 includes video content 131, performance data database 135, and executable code 140. Video content 131 may be a video content such as a television show, a movie, etc. In some implementations, video content 131 may include one or more characters portrayed by one or more actors.

Performance data database 135 may include performance data associated with a plurality of people who may be selected to be featured in video content 131. In some implementations, performance data database 135 may include video content and/or photographic content from which a model of the person may be constructed and rendered, such as a plurality of images of the person's face from various angles, a plurality of full body images of the person, etc. Performance data 105 may include data about a plurality of people, such as facial expression data, height data, weight data, etc., associated with each person who may be selected to be featured in a video content. In some implementations, performance data database 135 may include a plurality of people and performance data associated with each person. Performance data may include images, video clips, or other media contents that portray each person and may be used to feature each person in video content 131. In other implementations, performance data database 135 may include a pointer to where performance data for a person may be accessible, such as a uniform resource identifier (URI), a uniform resource locator (URL), a website, etc. Performance data database 135 may include performance data related to one or more scenes portrayed by each person in available video contents, such as whether performance data is available for the person performing certain actions, such as crying, dancing, jumping, running, etc.

Executable code 140 may include one or more software modules for execution by processor 120. As shown in FIG. 1, executable code 140 includes performance analysis module 141, featured person module 143, performance data retrieval module 145, personalization/customization module 147, and look and feel module 149. Performance analysis module 141 is a software module stored in memory 130 for execution by processor 120 to analyze the performance of one or more actors in video content 131. Analysis of the performance of an actor in video content 131 may include analyzing actions included in the performance, such as jumping, running, dancing, etc. In one implementation, analysis of the performance of the actor in video content 131 may include identifying certain types of scenes in video content 131, such as scenes in which the actor cries, sings, kisses, etc.

Featured person module 143 is a software module stored in memory 130 for execution by processor 120 to identify one or more people who may be featured in video content 131. In some implementations, featured person module 143 may receive a performance analysis from performance analysis module 141 including various elements of the role of the actor in video content 131. In one implementation, featured person module 143 may search performance data database 135 for one or more people who have all of the elements for the role of an actor in video content 131. In one implementation, featured person module 143 may search online for one or more people who have all of the elements for the role of an actor in video content 131. Featured person module 143 may identify one or more people who may be featured (e.g., inserted) in video content 131. In some implementations, a user may select one of the people to feature in video content 131.

In addition to or instead of inserting computer-generated images of a replacement actor in a movie, system 100 may allow a user to replace a voice of a character in the movie. For example, a user can replace the voice of an action hero or a villain in a movie with a voice of a child or cartoon character from another movie. As another example, a user can replace the voice of a child or cartoon character in the movie with a well-known action hero or villain from another movie.

Performance data retrieval module 145 is a software module stored in memory 130 for execution by processor 120 to retrieve performance data corresponding to an actor selected to be featured in video content 131. Performance data retrieval module 145 may retrieve images, video clips, audio clips, etc., that may be used to feature the person in video content 131. Performance data retrieval module 145 may retrieve data related to facial expressions made by the actor in video content 131 and facial expressions made by the user-selected person so that the selected person may accurately and faithfully be featured in video content 131. In some implementations, performance data retrieval module 145 may retrieve data that is related to the source material from which the performance data is retrieved, such as a resolution of the source material, a graininess of the source material, color saturation of the source material, and other qualities that help create the look and feel of the source material. For example, performance data retrieval module 145 may retrieve information that the source material for the selected person is a black and white film, a color film, is recorded using 35 mm film, was recorded at 24 frames per second (fps), 30 fps, 60 fps, etc.

Performance data retrieval module 145 may retrieve a scan or data sufficient to create a scan of the selected person that can be used to recreate the selected person in a video content such as video content 131. In some implementations, the scanning data collected may be based on specific instructions corresponding to the data needed to recreate the selected person. For example, a plurality of different images of the selected person may be required, such as a plurality of images with each image capturing the selected person's face from a specific angle, one or more full-body images of the selected person, images and/or video clips depicting the selected person performing certain actions, such as jumping, dancing, walking, etc.

Personalization/customization module 147 is a software module stored in memory 130 for execution by processor 120 to create a personalized/customized video content. In some implementations, personalization module 147 may use the performance data of the selected person to create a new video content. For example, a production company may create a new video content such as a movie using performance data from performance data database 135 to feature an actor who is not available to participate in production of the video content, such as a deceased actor. In other implementations, a production company may create a video content using performance data associated with a plurality of actors as a method of pre-screening each actor for a particular role prior to approaching each actor to participate. Creating a new video content may be used to test various moods, tones, and/or performances in a video content prior to producing a final version of video content 131.

In one implementation, personalization module 147 may replace one or more actors in video content 131 (such as a theatrical version of a movie) with one or more people. Personalization module 147 may receive video content 131 and performance data from performance data retrieval module 145 and create a personalized video content. In some implementations, the personalized video content may be a new video content featuring the selected person, or a previously recorded video content updated to feature the selected person. For example, personalization module 147 may replace an actor in video content 131 with a selected person, using the performance data to insert the selected person into video content 131. In some implementations, personalization module 147 may insert the selected person and include facial expressions, body language, or other idiosyncrasies of the selected person. For example, personalization module 147 may personalize a scene in video content 131 by updating the scene based on the person selected by the viewer, such as when a comedian is selected to replace an actor in a drama.

Look and feel module 149 is a software module stored in memory 130 for execution by processor 120 to update the look and feel of video content 131. In one implementation, updating the look and feel of video content 131 may include changing a resolution of video content 131, such as updating the resolution of video content 131 to match the resolution of performance data of the selected person. In one implementation, look and feel module 149 may update video content 131 to include a graininess of a film. The graininess may vary depending on a desired effect. For example, when the desired effect is to make video content 131 match an old film, such as a home video shot using an 8 mm video recorder, or a newscast or martial arts actor from a certain time period, such as the 1970s, look and feel module 149 may add an appropriate graininess to achieve the desired effect. In other implementations, look and feel module 149 may update the colors of video content 131 to appear to be from a certain time period. Look and feel module 149 may replace certain elements of video content 131, such as cars, buildings, costumes, etc., to give video content 131 an appearance from a specific time period and/or location.

Display device 180 may be a device for displaying video content 131, such as a television, a projector and screen, etc. In some implementations, display device 180 may be a device suitable for displaying video content 131 to a plurality of people in a group setting, such as a group of moviegoers viewing a movie in a movie theater. Display device 180 may be used to show part or all of video content 131. In some implementations, one or more elements of video content 131 may be replaceable, such as a character portrayed by an actor. In such an embodiment, permanent elements of video content 131 may be displayed on display device 180, such that a viewer watching video content 131 on display device 180 without a personal viewing device, such as user device 190, to show the replaceable elements would see video content 131 with the replaceable elements missing. User device 190 may be a personal viewing device, such as an augmented reality viewing device, a virtual reality headset, etc. In some implementations, user device 190 may be the same device as display device 180.

Figure 2:
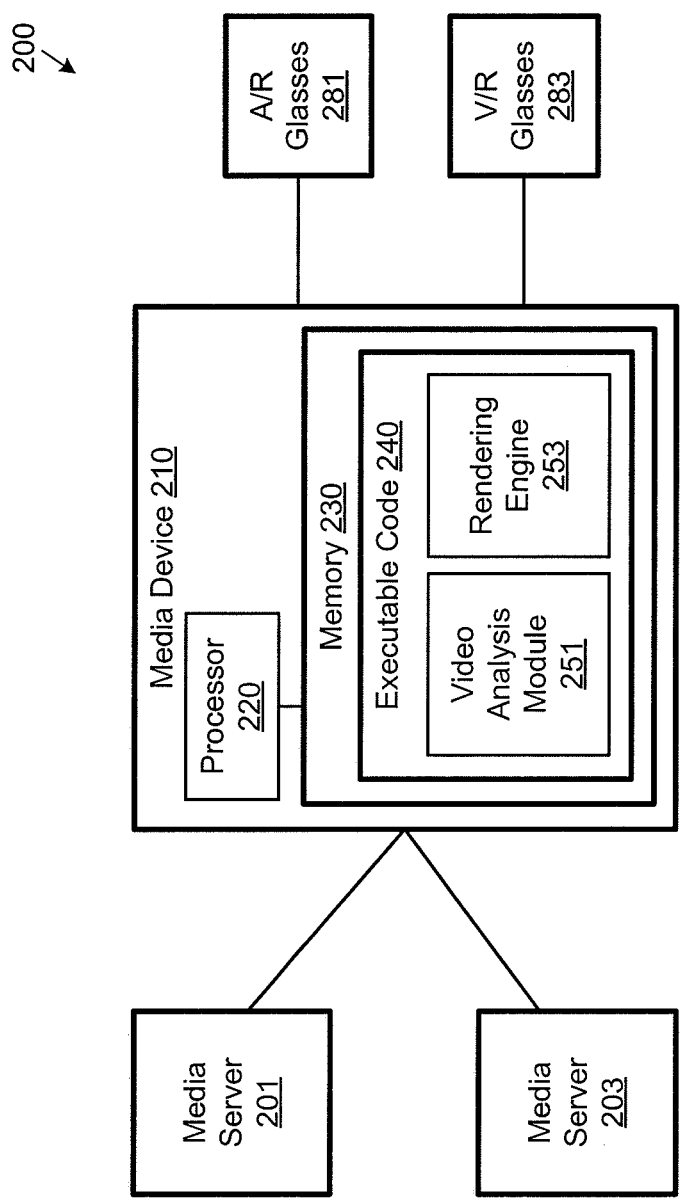
FIG. 2 shows a diagram of another exemplary system for featuring a person in a video using performance data associated with the person, according to one implementation of the present disclosure.

FIG. 2 shows a diagram of another exemplary system for featuring a person in a video content using performance data associated with the person, according to one implementation of the present disclosure. Diagram 200 shows media server 201, media server 203, media device 210, augmented reality (A/R) headset 281, and virtual reality (V/R) headset 283. Media server 201 and media server 203 may store media contents, including one or more video contents such as television shows, movies, commercials, internet videos, photographs, etc. Media servers 201 and 203 may store performance data related to a person and/or performance data resources associated with the person, such as photographs, images, video clips, etc., that may be stored on a computer network, such as the Internet.

Media device 210, processor 220, memory 230, and executable code 240 in FIG. 2 correspond to media device 110, processor 120, memory 130, and executable code 140 in FIG. 1. As shown in FIG. 2, memory 230 includes video analysis module 251 and rendering engine 253. Video analysis module 251 is a software module stored in memory 230 for execution by processor 220 to analyze elements of a video content. In some implementations, video analysis module may analyze a performance of one or more characters in video content 131 to identify elements of the various characters' performances, such as actions performed by each character, emotions shown by each character, etc. Rendering engine 253 is an executable software engine for rendering video contents and/or media contents. In some implementations, rendering engine 253 may render personalized video contents generated using personalization module 147 and transmit the personalized video content to A/R headset 281 and/or V/R headset 283.

Figure 3:
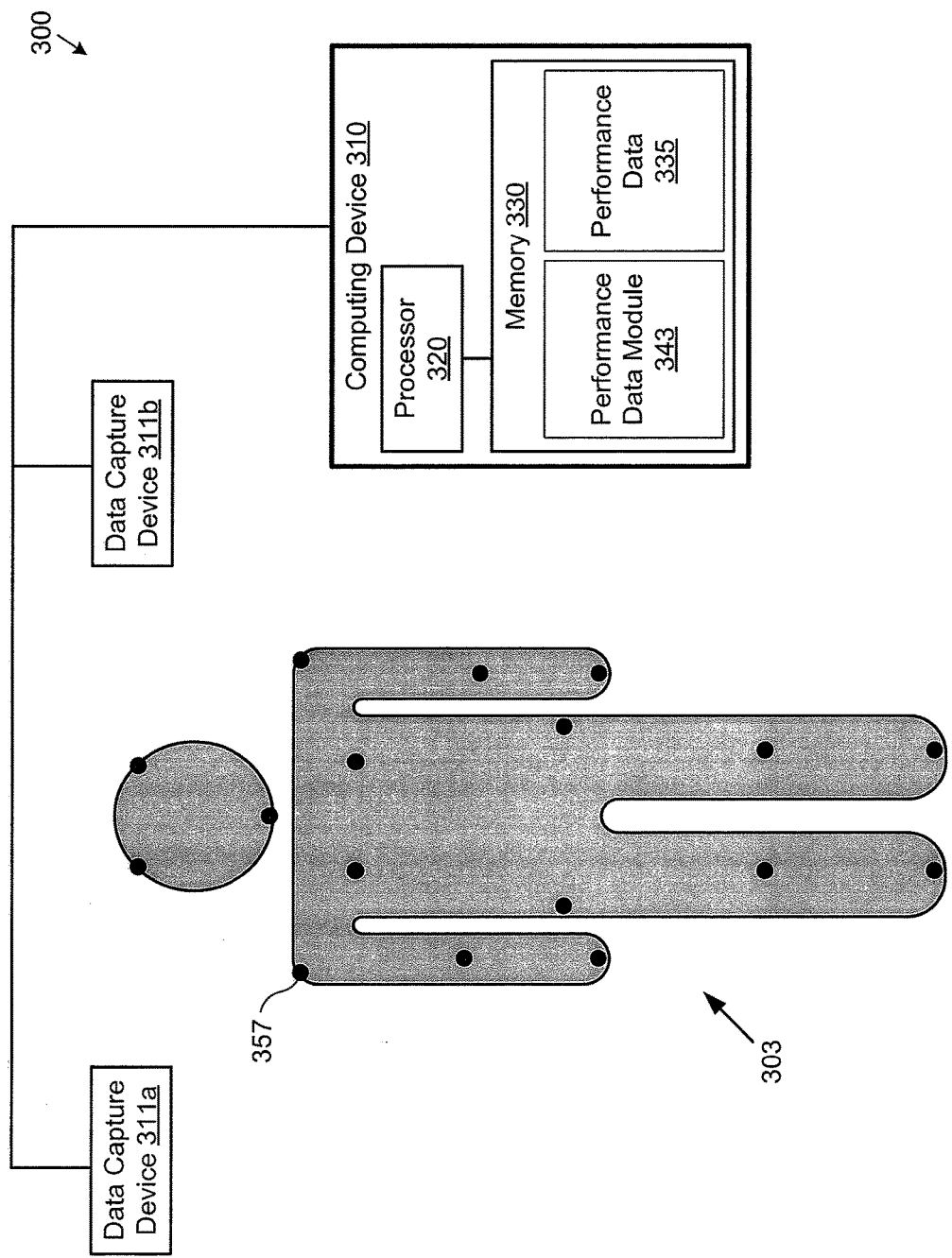
FIG. 3 shows a diagram of an exemplary system for capturing performance data associated with a person, according to one implementation of the present disclosure.

FIG. 3 shows a diagram of an exemplary system for capturing performance data associated with a person, according to one implementation of the present disclosure. Media device 310, processor 320, and memory 330 in FIG. 3 may correspond to media device 110, processor 120, and memory 130 in FIG. 1. Performance data module 343 is a software module stored in memory 330 for execution by processor 320 to capture and record performance data associated with individual 303. In some implementations, individual 303 may be an actor, such as an actor employed by a media production company. In other implementations, individual 303 may be a user of computing device 310. Performance data 335 may include various data and parameters describing individual 303, such as a stature of individual 303, motion data describing body motion of individual 303, facial expression data, voice and sounds, etc.

Diagram 300 shows individual 303 with a plurality of data point markers, including data point marker 357. The plurality of data point markers may be used for capturing performance data associated with individual 303. In one implementation, individual 303 may wear a suit having the plurality of data point markers attached to the suit. The plurality of data point markers may be visible light markers, such as white spherical markers attached to a black suit. In other implementations, the plurality of data point markers may include infrared tags, such as infrared reflectors attached to a suit worn by individual 303.

Individual 303 may act out various motions, such as running, jumping, dancing, etc. Performance data associated with individual 303 may be captured by recording motion-capture data such as the position and/or motion of each of the plurality of data point markers as individual 303 performs the various motions. Data capture device 311a and data capture device 311b may be devices for capturing data associated with individual 303. Data capture device 311a and data capture device 311b may be cameras, such as visible light cameras, infrared light cameras, etc., for capturing performance data associated with individual 303. In other implementations, data capture device 311a may be a scanner, such as a facial scanner for capturing and recording fine details about individual 303. In some implementations, facial scanners may have a resolution down to a millimeter or sub-millimeter resolution for detecting, capturing, and recording details of the face and facial expressions of individual 303. Such details may be recorded and stored in performance data 335. Individual 303 may make various facial expressions, and performance data module 343 may scan the expressions and store the data in performance data 335.

In one implementation, performance data module 343, using processor 320, may receive performance data associated with individual 303 from one or more data capture devices, such as data capture device 311a and/or data capture device 311*b*. Performance data module 343 may record performance data such as the position, motion, velocity, etc. of each data point marker attached to individual 303. In some implementations, performance data module 343 may store the performance data associated with individual 343 in performance data 335. Performance data 335 may describe individual 303 including information associated with physical movement and/or abilities of individual 303.

Figure 4:
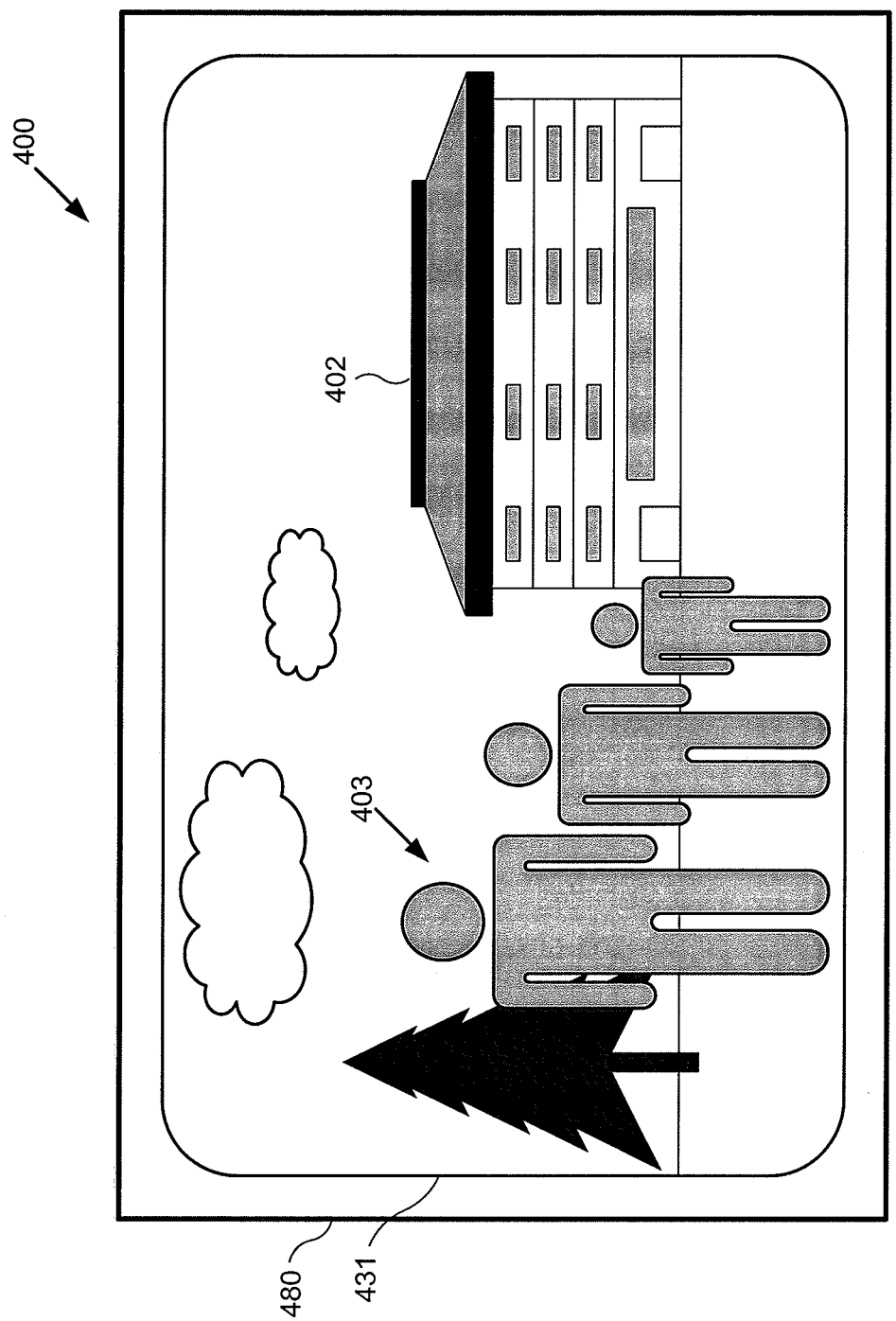
FIG. 4 shows a diagram of an exemplary video for use with the system of FIG. 1, according to one implementation of the present disclosure.

FIG. 4 shows a diagram of an exemplary video content for use with the system of FIG. 1, according to one implementation of the present disclosure. Diagram 400 shows video content 431 displayed on display 480. As shown in FIG. 4, video content 431 includes a plurality of characters in a scene. In some implementations, a viewer may wish to watch video content 431 with one or more elements different from the production version of video content 431, such as taking place in a different setting, having a different look and feel, with a character portrayed by a different actor, etc. In one implementation, the viewer may select building 402 and choose a replacement setting or alternate location for video content 431. In one implementation, the viewer may select a look and feel for video content 431, such as the look and feel of a classic film including a graininess of the film, colors consistent with old film, etc. In one implementation, a viewer of video content 431 may select character 403 to be replaced by a selected person. The viewer may select character 403 using an input device such as a computer mouse, a remote control, gesture recognition, etc. In other implementations, the viewer may select the replaceable character to be replaced from a menu that appears prior to the beginning of video content 431 or when the viewer pauses playback of video content 431.

In some implementations, the viewer may select a person to portray character 403 in video content 431. When the viewer selects an actor to replace, featured person module 143 may (1) provide a list of people from which a user may select a person to feature in video content 131, such as a pre-determined list including one or more people for whom a personalized video content has already been produced and/or rendered; and/or (2) display an input window allowing the user to manually enter a name of a desired person to feature in the personalized video content, and the system will retrieve data (as described above and below) to render that person into the video content 431.

FIG. 5 shows a diagram of an exemplary user interface for featuring a person in a video content using performance data associated with the person, according to one implementation of the present disclosure. User interface 500 includes column 515 and column 525. Column 515 includes a plurality of replaceable characters in video content 131 and column 525 includes one or more people for each replaceable character in column 515. In some implementations, user column 525 may include one or more metrics, such as quality of prior captured performances and/or popularity selected by other users, to help the viewer select a person to replace an actor in video content 131. In one implementation, a person may be available to replace more than one character in video content 131. For example, Character A has may be replaced using Actor 1, Actor 2, and Actor 3. The user may select Actor 1 to replace Character D. In some implementations, once the user has selected a person to replace one actor, the selected person may not be selectable to replace another actor in video content 131. In other implementations, the user may select a person to replace two or more actors in video content 131.

The quality scale may be based on one or more factors, such as the amount of source material available as performance data for an actor, which may affect the ability of personalization module 147 to insert the selected person into video content 131, the frame rate of the source material available as performance data for the actor, the resolution of the source material available as performance data for the actor, the age of the source material available as performance data for the actor, etc. The popularity of a selected person may be based on a frequency that the selected person is selected by other users, a rating entered by previous viewers who selected that person, etc. In some implementations, the popularity of a person may reflect an overall popularity of the person as a replacement actor, or the popularity may reflect the particular person in the specific replacement role in video content 131.

Figure 6:
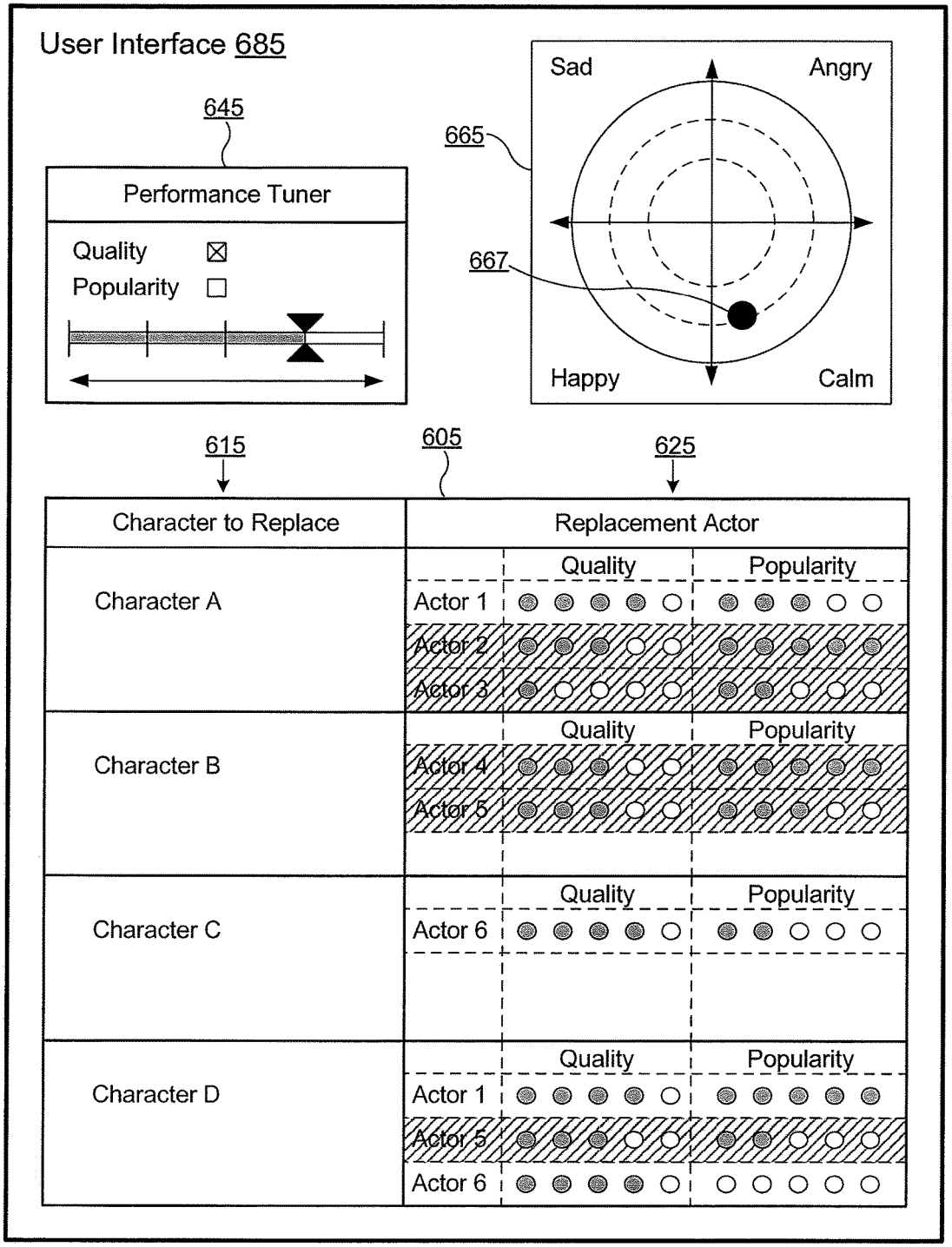
FIG. 6 shows a diagram of another exemplary user interface for featuring a person in a video using performance data associated with the person, according to one implementation of the present disclosure.

FIG. 6 shows a diagram of another exemplary user interface for featuring a person in a video content using performance data associated with the person, according to one implementation of the present disclosure. User interface 685 includes performance tuner or filter 645, mood tuner 665, and table 605 including column 615 listing one or more characters to replace and column 625 including possible replacements for the characters in column 615. Performance tuner or filter 645 may be a tool that a user may use to more finely tune or filter the options related to creation of a personalized video content. As shown in FIG. 6, performance tuner 645 includes selectable options to tune or filter for a replacement actor's quality or popularity. In one implementation, the user may adjust performance tuner 645 to limit the options of replacement actors that are available to select. In FIG. 6, performance tuner 645 is set to limit selectable replacement actors to those having a quality rating of four (4) or higher. Accordingly, only Actor 1 and Actor 6 remain selectable, because each of Actors 2-5 have a quality rating of three (3) or lower. In some implementations, performance tuner may include two selectors allowing a user to set a range, such as actors having a quality or popularity between two and four.

Mood/emotion tuner 665 may include a range of characteristics that may be described as a mood associated with an actor. As shown in FIG. 3, mood tuner 665 includes moods to differentiate actors by a rating of sad, happy, angry, and calm. In some implementations, mood tuner may include any descriptions of an actor's mood, and may include more or less than four mood descriptors. In some implementations, actors may populate column 625 as their mood is selected using mood tuner 665, or replacements may become selectable or de-selectable based on the user setting of mood tuner 665. In some implementations, a user may indicate the desired mood or mood-range by the placement of mood indicator 667. In one embodiment, the user can select a replacement actor, and then use the mood tuner 665 to adjust or modify the mood of the actor's performance in the video content. It may be funny to watch a movie with actors that over-react or under-react to events in a movie.

Figure 7:
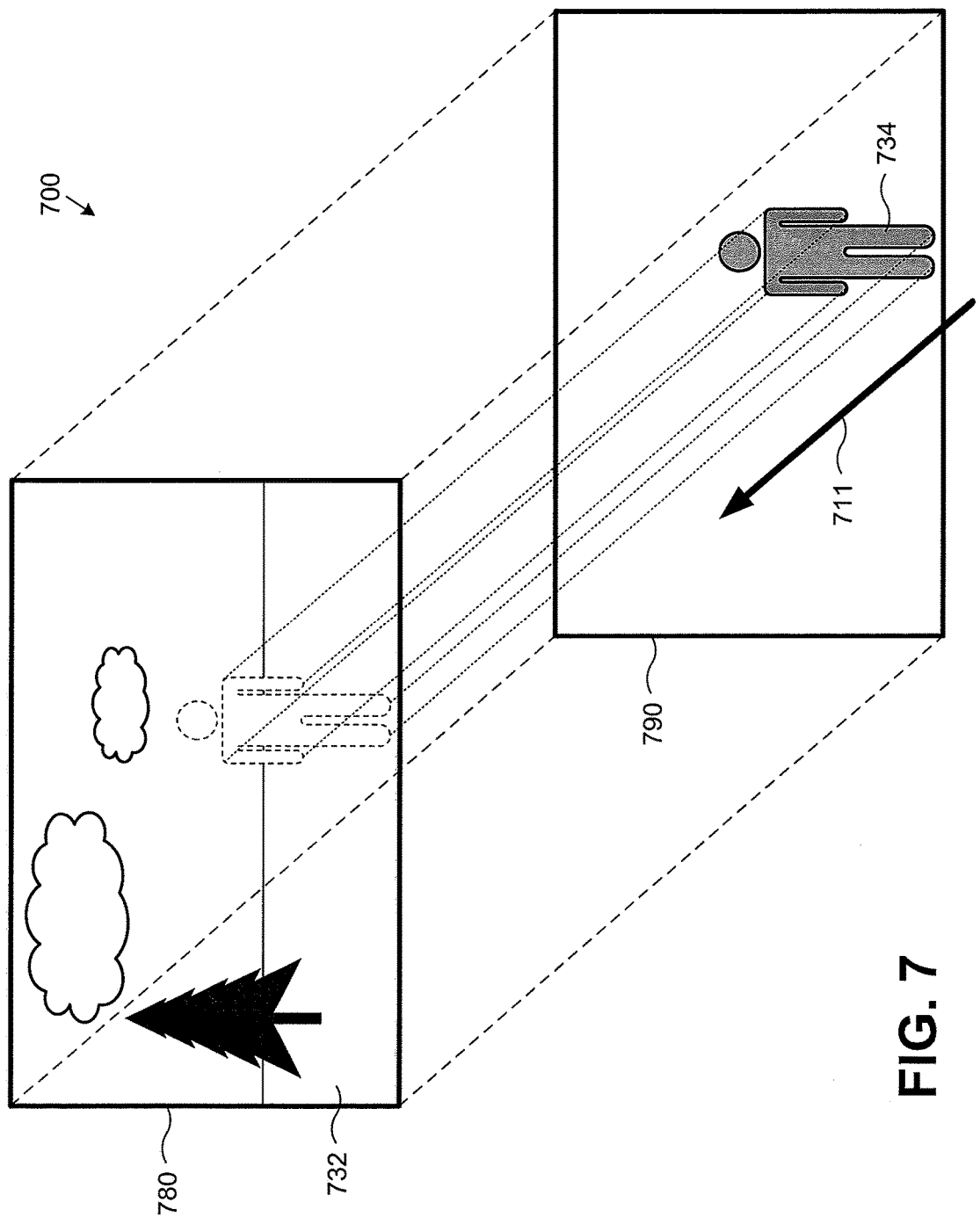
FIG. 7 shows a diagram of an exemplary display for featuring a person in a video using performance data associated with the person, according to one implementation of the present disclosure.

FIG. 7 shows a diagram of an exemplary display for featuring a person in a video content using performance data associated with the person, according to one implementation of the present disclosure. Diagram 700 shows back plate 732 of video content 131 including non-replaceable elements displayed on display device 780. Featured person 734 is shown on user device 790. A user may view video content 131 through user device 790 along line-of-sight 711, such that featured person 734 appears to the viewer projected into back plate 732 creating the personalized video content. In one implementation, user device 790 may be an augmented reality device, such as an augmented reality headset, allowing a plurality of viewers to each view a personalized video content in a communal setting, such as a movie theater. In other implementations, back plate 732 and featured person 734 may be displayed to a viewer on one screen, such as in a virtual reality device or on a television, computer display, etc.

In one implementation, video content 131 may be a movie shown in a movie theater where many viewers may watch video content 131 at the same time, and each viewer may desire to feature a person in video content 131. In such an implementation, display device 780 may be the projection screen of the movie theater showing back plate 732. Each viewer in the movie theater may be wearing a viewing device, such as A/R headset 281 or V/R headset 283 in FIG. 2 allowing each viewer to view video content 131 featuring a person of the viewer's choosing. In one implementation, viewers who wish to watch video content 131 with the look and feel in a certain way may wear A/R headset 181, and viewers who wish to view video content 131 with a personalized look and feel may wear V/R headset 182. Accordingly, a plurality of viewers may experience video content 131 in a communal setting with each viewer experiencing a personalized version of video content 131.

Figure 8:
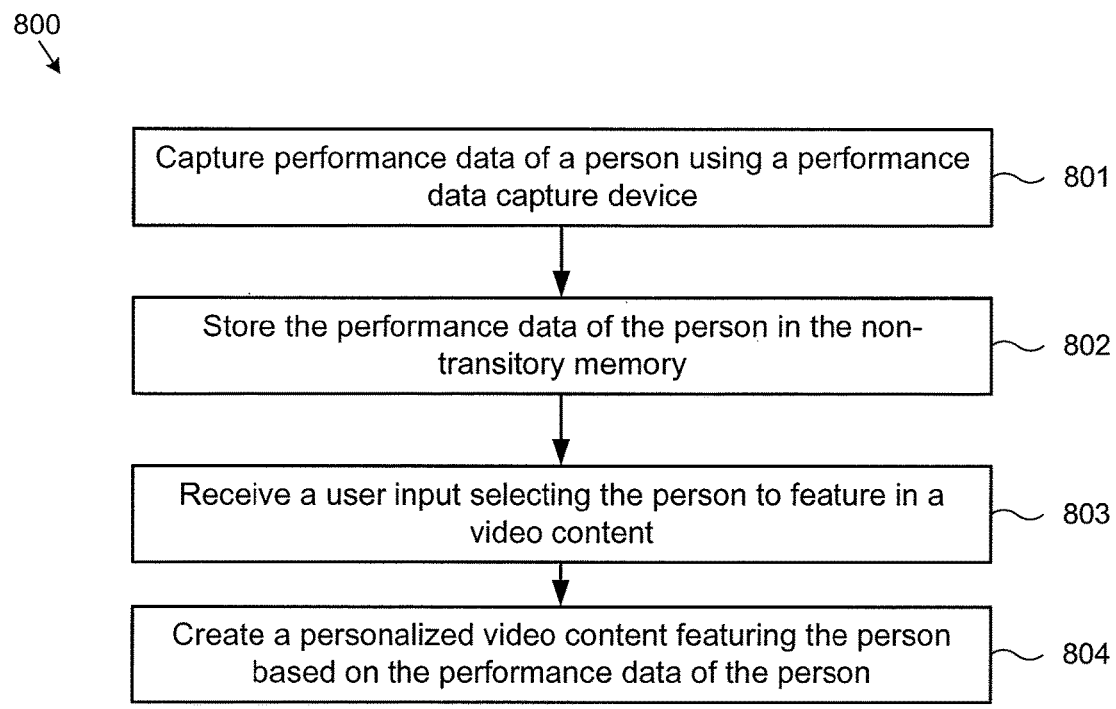
FIG. 8 shows a flowchart illustrating an exemplary method of capturing performance data associated with a person and creating a personalized video based thereon, according to one implementation of the present disclosure.

FIG. 8 shows a flowchart illustrating an exemplary method of capturing performance data associated with a person and creating a personalized video content based thereon, according to one implementation of the present disclosure. Method 800 begins at 801, where performance data module 343 captures performance data of a person using performance data capture device 311. In some implementations, individual 303 may wear a suit having a plurality of data point markers attached thereto. Performance data module 343 may capture and record various movements of individual 303, such as motion data associated with running, dancing, jumping, etc. In other implementations, performance data module 343 may capture and record data by scanning individual 303 as individual 303 moves, or while individual 303 is in various poses. In one implementation, performance data module 343 may capture and record the face of individual 303 in various poses to capture the facial structure of individual 303, facial expressions made by individual 303, etc. At 802, performance data module 343 stores the performance data of individual 303 in performance data 335.

Method 800 continues at 803, where personalization module 147 receives a user input selecting the person to feature in a video content. For example, the user may select a replacement using a user interface such as user interface 685. User interface 685 may be displayed in display device 180 or user device 190. In some implementations, the user may provide the user input using an input device such as a mouse, a remote control, a touch screen interface, etc. The user may select a character in video content 131 to be replaced and then select a replacement to feature in the personalized video content.

At 804, personalization module 147 creates a personalized video content featuring the person based on the performance data of the person. In some implementations, creating a personalized video content may include creating a new video content using performance data 335. For example, the personalized video content may be a new video content that depicts a person, such as an actor, constructed from the visual data and motion data captured by data capture device 311 and stored in performance data 335. In some implementations, performance data 335 may include audio of individual 303 speaking, and the personalized video content may include an audio of the actor speaking lines created from performance data 335. In other implementations, the personalized video content may include replacing an actor in an existing video content with the selected person. For example, video content 131 may be a movie, and the user may select a character in the movie to replace. The personalized video content may include the existing movie with the selected person replacing the actor. In some implementations, the selected person may be an actor, such as an actor employed by the movie production company that produced the existing movie, or the selected person may be another actor, or anther person, such as the user. Personalization module 147 may create a personalized video content based on performance data associated with the selected person.

Figure 9:
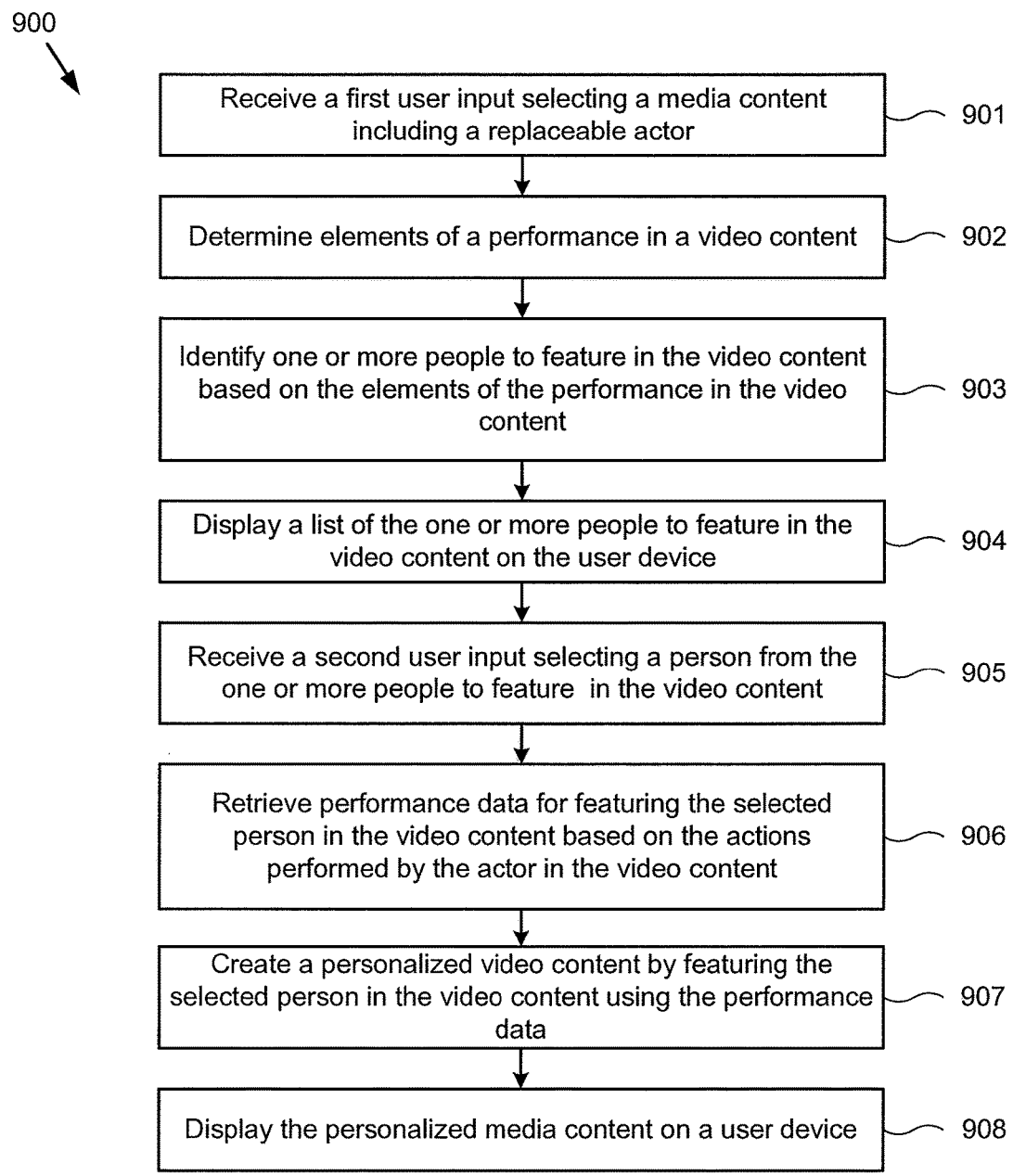
FIG. 9 shows a flowchart illustrating an exemplary method of featuring a person in a video using performance data associated with the person, according to one implementation of the present disclosure.

FIG. 9 shows a flowchart illustrating an exemplary method of featuring a person in a video content using performance data associated with the person, according to one implementation of the present disclosure. Method 900 begins at 901, where executable code 140 receives a first user input selecting video content 131 including an actor. The user input may select video content 131 to play on an entertainment device, such as a home DVD player or an internet-connected gaming system. In one implementation, the user input may select video content 131 to stream, such as a television show or movie to stream from an online subscription service, or a digital video content to stream from an online library of video contents owned by the viewer. In some implementations, video content 131 may include one or more replaceable actors.

At 902, executable code 140 determines elements of a performance in a video content. In some implementations, performance analysis module 141 may analyze a performance of an actor in video content 131 to identify actions taken by the actor. Performance analysis module 141 may identify a scene in which the actor cries, a scene in which the actor dances a ballroom dance, a scene in which the actor runs and jumps, etc. In some implementations, performance analysis module 141 may analyze facial expressions made by the actor, posturing or body language of the actor, etc. Performance analysis module 141 may identify elements of the performance of the actor that may be difficult to recreate without performance data including examples performed by the selected person.

At 903, executable code 140 identifies one or more people to feature in the video content based on the elements of the performance in video content 131, including actions performed by the actor in video content 131. In one implementation, featured person module 143 may search performance data database 135 to identify one or more people. Performance data database 135 may include a plurality of people and a list of performance data for each person. For example, performance data database may include performance data of the plurality of people dancing, singing, running, jumping, etc. Performance data database 135 may include an indication of certain elements for which the one or more of the plurality of people lack performance data. For example, if a person in performance data database 135 has not appeared in scene where the person is laughing, performance data database 135 may indicate that the person lacks performance data for laughing. In some implementations, featured person module 143 may return only people having each element of performance data necessary to fulfill the role of the actor in video content 131.

In other implementations, featured person module 143 may search one or more remote resources to find performance data for people. For example, featured person module 143 may search the Internet for performance data of one or more people. In one implementation, featured person module 143 may search one or more websites for images, video clips, movies, or other previous performances by people that may be used as performance data for the people.

At 904, executable code 140 displays a list of the one or more people to feature in video content 131 on user device 190. In some implementations, featured person module 143 may present a list of people from which the viewer may select a person to replace the actor in video content 131. The list may include people for whom performance data is included in performance data database 135, people whom performance data database indicates the necessary performance data is available but is not stored in performance data database 135, people for whom featured person module 143 has determined performance data is available online, etc.

At 905, executable code 140 receives a user input selecting a person from the one or more people to feature in video content 131 from the one or more people. In some implementations, the viewer may select a person from the list displayed on user device 190. In other implementations, the viewer may enter the name of a desired person in a search field using user device 190. If the desired actor is an available, the desired person may be selected. In some implementations, the desired person may not be available, for example, due to a lack of sufficient performance data, in which case featured person module 143 may display a message to the viewer indicating that the desired person is not available for that role.

At 906, executable code 140 retrieves performance data for featuring the selected person in the video content based on the actions performed by the actor in video content 131. Performance data may include images, video clips, or other media contents depicting the selected person. Performance data retrieval module 145 may retrieve the performance data from performance data database 135, various online resources, a combination of performance data stored in performance data database 135 and various online resources, etc. For example, when the selected person is an actor with performance data in performance data database 135, performance data retrieval module 145 may retrieve the performance data from performance data database 135 for use in replacing the actor in video content 131 with the selected person. In one implementation, performance data retrieval module 145 may follow pointers stored in performance data database 135 to performance data, for example, when the performance data is found on a website. In another implementation, performance data retrieval module 145 may retrieve performance data from various online resources, such as youtube.com, imdb.com, etc.

At 907, executable code 140 creates a personalized video content by featuring the selected person in the video content using the performance data. In one implementation, the personalized video content may be a new video content created using the performance data. For example, performance data database 135 may include performance data for an actor, and a video content producer may create a new video content featuring the actor using the performance data. Creation of a new video content using stored performance data may enable a production company that owns the rights to an actor's image and likeness to create, for example, a sequel to a movie that featured the actor, create video content featuring a younger version of the actor based on the performance data, create new video content after the actor has retired from acting or is deceased, etc. In one implementation, performance data may be used to include a younger version of an actor in a video content, such as in a flashback scene, so the same actor portrays the younger version of the character in the flashback.

In some implementations, personalization module 147 may insert the selected person into video content 131 using the performance data retrieved by performance data retrieval module 145. For example, personalization module 147 may use performance data to insert the selected person into video content 131, including facial expressions of the selected person based on facial expressions of the actor, actions of the selected person based on actions of the actor, etc. In one implementation, prior to inserting the selected person into video content 131, personalization module 147 may extract the actor from video content 131. Extracting the actor from video content 131 may allow insertion of a selected person who has a different stature than the actor.

In some implementations, personalization module 147 may replace the voice of the actor in video content 131 with a new audio including the voice of the selected person. The new audio may include the voice of the selected person synthesized to recite the lines spoken by the actor in video content 131. In one implementation, the new audio may include words not spoken by the actor in video content 131, such as when a scene is replaced or updated based on the selected person. For example, when a comedian is selected to replace an actor in a drama, a scene may be updated to include a comedic line spoken by the selected person in addition to, or in place of, one or more lines spoken by the actor in video content 131. In one implementation, personalization module 147 may update audio of one or more characters in video content 131 when the selected person is a male actor replacing a female actor, or a female selected person replaces a male actor. For example, personalization module 147 may update the audio so that the personalized video content has an audio that includes pronouns corresponding to the selected person.

Look and feel module 149 may update the look and feel of video content 131. In some implementations, look and feel module 149 may update video content 131 to have a look and feel that matches the look and feel of performance data of the selected person. For example, video content 131 may be a movie that is filmed using high definition cameras and be produces for viewing on a high definition television, and the selected person may be an actor having performance data limited to movies filmed in the 1970s that do not have a high definition resolution and includes graininess from the film. Accordingly, look and feel module 149 may update the look and feel of video content 131 to match the resolution and/or graininess of the performance data in the personalized video content. In some implementations, the personalized video content may include alternate scenes and/or alternate narratives based on the selected person. Method 900 continues at 908, where executable code 140 displays the personalized video content on user device 190. In some implementations, executable code 140 may display the personalized video content on display device 180, user device 190, or a combination of display device 180 and user device 190.

In one implementation, a director may create a personalized video content to envision video content 131 with one or more different actors. For example, the director may film a test scene from video content 131 and then replace one or more actors in the test scene with various actors as a tool to envision video content 131 with different actors. In other implementations, the personalized video content may include two versions of the same actor. For example, video content 131 may include a flashback to a time in the past that includes a younger version of one or more characters. The younger versions of the characters may be based on a history of performance data of the actors, so a different actor will not portray the younger version of the character. In one implementation, the viewer may capture replacement character data and become the selected person. In such an implementation, the system may provide instructions to capture performance data required by video content 131 and may provide instructions to the viewer how to capture the performance data, such as by instructing the viewer to take a plurality of images of the viewer's face from various angles, record various activities such as dancing, crying, running, etc., enabling the viewer to insert him/her self into the personalized video content.

Figure 10:
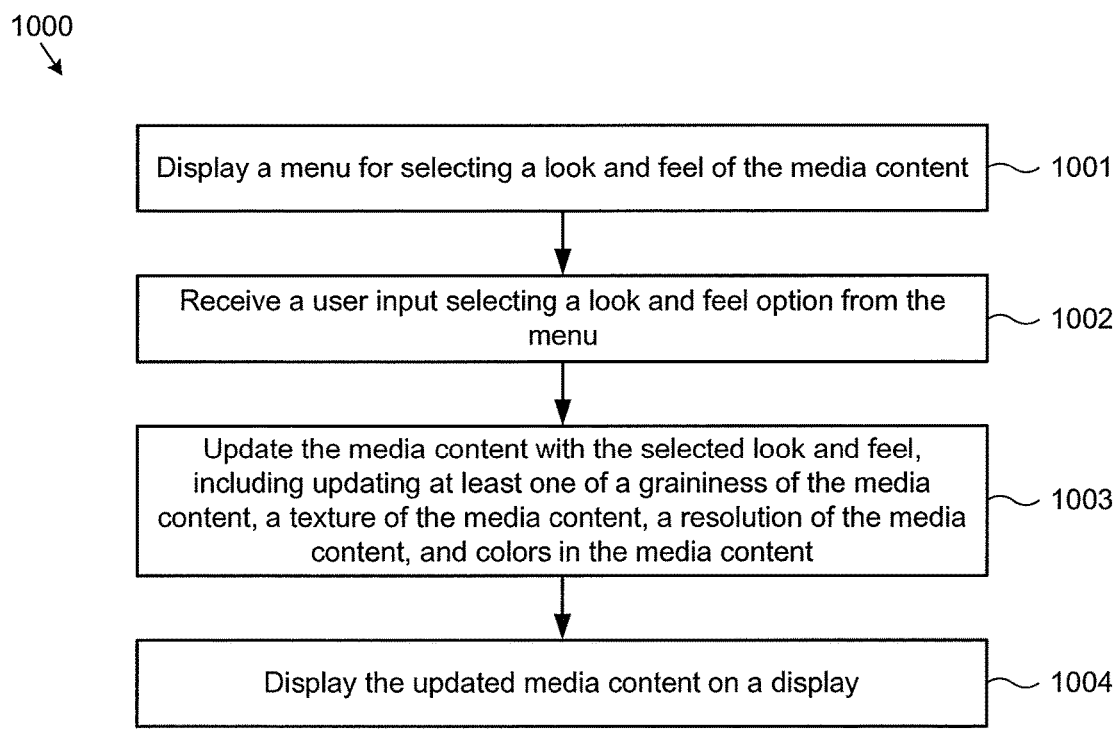
FIG. 10 shows a flowchart illustrating another exemplary method of featuring a person in a video using performance data associated with the person, according to one implementation of the present disclosure.

FIG. 10 shows a flowchart illustrating another exemplary method of featuring a person in a video content using performance data associated with the person, according to one implementation of the present disclosure. Method 1000 begins at 1001, where executable code 140 displays a menu for selecting a look and feel for the personalized video content. In some implementations, the viewer may wish to see video content 131 with a different look and feel. For example, video content 131 may be a contemporary action movie and the viewer may want to see video content 131 with the look and feel of a classic black-and-white mob movie, the look and feel of a home movie, etc. The menu may include options such as a genre with which to update the look and feel, or may include options of elements to change or add, such as an option to select the desired resolution, an option to select a desired film type, such as 8 mm film or 35 mm film, an option to add or change a graininess of the film, an option to select a color saturation, etc.

At 1002, executable code 140 receives a user input selecting a look and feel option from the menu. In some implementations, the user may select an option from the menu using an input device, such as a computer mouse or a remote control. Method 1000 continues at 1003, where executable code 140 updates the personalized video content with the selected look and feel, including at least one of a graininess of the personalized video content, a texture of the personalized video content, a resolution of the personalized video content, colors in the personalized video content, etc. At 1004, executable code 140 displays the updated personalized video content on display device 180, user device 190, or a combination of display device 180 and user device 190.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
    a performance data database including performance data for each of a plurality of persons;
    a non-transitory memory storing an executable code; and
    a hardware processor executing the executable code to:
        determine actions performed by an actor in a video having permanent elements and replaceable elements including the actor;
        identify one or more people to feature in the video who have the performance data in the database matching the actions performed by the actor in the video;
        receive a user input selecting a person from the one or more identified people to feature in the video;
        retrieve the performance data of the selected person from the performance data database based on the actions performed by the actor in the video;
        create a personalized video by featuring the selected person in the video using the performance data of the selected person; and
        display the permanent elements of the personalized video on a display device viewable by a plurality of viewers, and display the replaceable elements of the personalized video, including the selected person, on an augmented reality (A/R) headset worn by one of the plurality of viewers.

2. The system of claim 1 further comprising a display, wherein the hardware processor executes the executable code to provide a user interface on the display for receiving the user input selecting the person from the one or more identified people to feature in the video, the user interface including a mood tuner that differentiates the one or more identified people using a mood rating.

3. The system of claim 1, wherein creating the personalized video includes replacing the actor in the video with the selected person.

4. The system of claim 1, wherein creating the personalized video includes updating a scene in the video using the selected person.

5. The system of claim 1, wherein, prior to receiving the user input selecting the selected person, the hardware processor further executes the executable code to:
    display a list of the one or more identified people selectable by the user to feature in the video on the user device.

6. The system of claim 1, wherein the performance data of the selected person is retrieved from an online resource.

7. A method for use with a system including a performance data database including performance data for each of a plurality of persons, a non-transitory memory and a hardware processor, the method comprising:
    determining, using the hardware processor, actions performed by an actor in a video having permanent elements and replaceable elements including the actor;
    identifying, using the hardware processor, one or more people to feature in the video who have the performance data in the database matching the actions performed by the actor in the video;
    receiving, using the hardware processor, a user input selecting a person from the one or more identified people to feature in the video;
    retrieving, using the hardware processor, the performance data of the selected person from the performance data database based on the actions performed by the actor in the video;
    creating, using the hardware processor, a personalized video by featuring the selected person in the video using the performance data of the selected person; and
    displaying the permanent elements of the personalized video on a display device viewable by a plurality of viewers, and display the replaceable elements of the personalized video, including the selected person, on an augmented reality (A/R) headset worn by one of the plurality of viewers.

8. The method of claim 7, wherein the system further includes a display, and wherein the method further comprises:
providing a user interface on the display for receiving the user input selecting the person from the one or more identified people to feature in the video, the user interface including a mood tuner that differentiates the one or more identified people using a mood rating.

9. The method of claim 7, wherein creating the personalized video includes replacing the actor in the video with the selected person.

10. The method of claim 7, wherein creating the personalized video includes updating a scene in the video using the selected person.

11. The method of claim 7, wherein, prior to receiving the user input selecting the selected person, the method further comprises:
displaying, using the hardware processor, a list of the one or more identified people selectable by the user to feature in the video on the user device.

12. The method of claim 7, wherein the performance data of the selected person is retrieved from an online resource.

13. The system of claim 1 further comprising:
a performance data capture device including a suit wearable by the person, wherein the suit has a plurality of data point markers;
wherein the system is configured to:
capture the performance data using the suit worn by each of the plurality of persons; and
store the performance data of each of the plurality of persons captured by the plurality of data point markers of the suit in the non-transitory memory.

14. The system of claim 13, wherein the performance data includes a stature, a body motion, and facial expressions of each of the plurality of persons.

15. The system of claim 13, wherein the personalized video is one of a new video and a previously recorded video updated to feature one of the plurality of persons.

16. The system of claim 13, wherein capturing the performance data includes at least one of scanning each of the plurality of persons and recording motion-capture data of each of the plurality of persons.

* * * * *